United States Patent
Xin et al.

(10) Patent No.: US 12,137,016 B2
(45) Date of Patent: Nov. 5, 2024

(54) DATA MODULATION METHOD AND APPARATUS, DEVICE, AND STORAGE MEDIUM

(71) Applicant: ZTE CORPORATION, Guangdong (CN)

(72) Inventors: Yu Xin, Guangdong (CN); Jian Hua, Guangdong (CN); Liujun Hu, Guangdong (CN); Guanghui Yu, Guangdong (CN); Jin Xu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 18/012,261

(22) PCT Filed: Jun. 21, 2021

(86) PCT No.: PCT/CN2021/101139
§ 371 (c)(1),
(2) Date: Dec. 22, 2022

(87) PCT Pub. No.: WO2021/259177
PCT Pub. Date: Dec. 30, 2021

(65) Prior Publication Data
US 2023/0246895 A1    Aug. 3, 2023

(30) Foreign Application Priority Data
Jun. 22, 2020 (CN) .......................... 202010576322.6

(51) Int. Cl.
*H04L 27/26* (2006.01)
*H04L 27/20* (2006.01)
*H04L 27/34* (2006.01)

(52) U.S. Cl.
CPC ...... *H04L 27/2617* (2013.01); *H04L 27/2053* (2013.01); *H04L 27/2636* (2013.01); *H04L 27/2691* (2013.01); *H04L 27/3405* (2013.01)

(58) Field of Classification Search
CPC ............. H04L 27/2617; H04L 27/2053; H04L 27/2636; H04L 27/2691; H04L 27/3405; H04L 27/2634; H04L 27/3472
(Continued)

(56) References Cited

U.S. PATENT DOCUMENTS

2016/0127046 A1* 5/2016 Zhang .................. H04L 27/183
                                                    398/188
2017/0111205 A1* 4/2017 Kasher ................. H04L 27/361
2018/0192424 A1    7/2018 Zhang

FOREIGN PATENT DOCUMENTS

CA    2734064 A1 *  2/2010  ............. H04L 27/02
CN  101447854 A  *  6/2009  ......... H04B 7/15592
(Continued)

OTHER PUBLICATIONS

International Search Report dated Aug. 16, 2021, for Application No. PCT/CN2021/101139 (four (4) pages).
(Continued)

*Primary Examiner* — Tanmay K Shah
(74) *Attorney, Agent, or Firm* — KDW Firm PLLC (57) ABSTRACT

Provided are a data modulation method and apparatus, a device, and a storage medium. The data modulation method includes that: a modulation manner is configured, where a constellation point modulation symbol of the modulation manner is formed by combining a first group of constellation point modulation symbols and a second group of constellation point modulation symbols; and data is modulated by using the modulation manner, where the data includes a first data block and a second data block, the first data block is modulated by the first group of constellation point modula-
(Continued)

Configure a modulation manner, where a constellation point modulation symbol of the modulation manner is formed by combining a first group of constellation point modulation symbols and a second group of constellation point modulation symbol — S110

Modulate data by using the modulation manner, where the data includes a first data block and a second data block, the first data block is modulated by the first group of constellation point modulation symbols, and the second data block is modulated by the second group of constellation point modulation symbols — S120 tion symbols, and the second data block is modulated by the second group of constellation point modulation symbols.

20 Claims, 5 Drawing Sheets

(58) Field of Classification Search
USPC .......................................................... 375/262
See application file for complete search history.

(56) References Cited

FOREIGN PATENT DOCUMENTS

| CN | 107347045 A | * | 11/2017 | ........... H04L 1/0058 |
|---|---|---|---|---|
| CN | 108200001 A | | 6/2018 | |
| CN | 108900291 B | * | 10/2020 | ......... H04L 27/2601 |
| CN | 11901277 A | | 11/2020 | |
| CN | 111901277 A | | 11/2020 | |
| WO | WO-2010015127 A1 | * | 2/2010 | ........... H04B 7/0669 |

OTHER PUBLICATIONS

ZTE, "Modulation and PAPR Reduction for Uplink of Nb-Iot", 3GPP TSG RAN WG1 Meeting # 84, R1-160481, St Julian's, Malta, Feb. 15-19, 2016.

Mhedhbi et al., "Analysis and Evaluation of Pattern Division Multiple Access Scheme Jointed With 5G Waveforms," IEEE Access, vol. 7: 21826-21833 (Feb. 2019) <doi: 10.1109/ACESS.2019.2893362 >.

Extended European Search Report issued in EP Application No. 21828668.0, dated Jul. 5, 2024, 21 pages.

* cited by examiner

DATA MODULATION METHOD AND APPARATUS, DEVICE, AND STORAGE MEDIUM

CROSS-REFERENCE TO RELATED APPLICATIONS

This application is a national phase claiming the benefit of and priority to International Patent Application No. PCT/CN2021/101139, entitled "DATA MODULATION METHOD AND APPARATUS, DEVICE, AND STORAGE MEDIUM", filed Jun. 21, 2021, which claims priority to Chinese Patent Application No. 202010576322.6, filed Jun. 22, 2020, which are hereby incorporated by reference in their entireties.

The present application claims priority to Chinese Patent Application No. 202010576322.6, filed with the China National Intellectual Property Administration (CNIPA) on Jun. 22, 2020, the disclosure of which is incorporated herein by reference in its entirety.

TECHNICAL FIELD

The present application relates to the technical field of communications, and for example, a data demodulation method and apparatus, a device, and a storage medium.

BACKGROUND

The phase noise is relatively large in a high frequency scene, and even if a receiving terminal performs phase compensation, much phase noise remains. Meanwhile, the Doppler shift in the high frequency scene is larger, and some phase deviations will remain in a data symbol even if the receiving terminal performs a frequency offset compensation. Especially for some low-level terminals, the phase noise will be larger due to the low cost and poor performance of the device.

Therefore, how to suppress the phase noise without affecting the efficiency of a system is a technical problem to be solved.

SUMMARY

The present application provides a data modulation method and apparatus, a device, and a storage medium.

In a first aspect, the present application provides a data modulation method, the method includes that: a modulation manner is configured, where a constellation point modulation symbol of the modulation manner is formed by combining a first group of constellation point modulation symbols and a second group of constellation point modulation symbols; and data is modulated by using the modulation manner, where the data includes a first data block and a second data block, the first data block is modulated by the first group of constellation point modulation symbols, and the second data block is modulated by the second group of constellation point modulation symbols.

In a second aspect, the present application provides a data modulation apparatus, and the apparatus includes a configuration module and a modulation module. The configuration module is configured to configure a modulation manner, where a constellation point modulation symbol of the modulation manner is formed by combining a first group of constellation point modulation symbols and a second group of constellation point modulation symbols. The modulation module is configured to modulate data by using the modulation manner, where the data includes a first data block and a second data block, the first data block is modulated by the first group of constellation point modulation symbols, and the second data block is modulated by the second group of constellation point modulation symbols.

In a third aspect, the present application provides a device. The device includes one or more processors and a storage apparatus. The storage apparatus is configured to store one or more programs. The one or more programs, when executed by the one or more processors, cause the one or more processors to implement any of the methods in the embodiments of the present application.

In a fourth aspect, the present application provides a storage medium. The storage medium stores a computer program. The computer program, when executed by a processor, implements any of the methods in the embodiments of the present application.

DETAILED DESCRIPTION

Hereinafter, embodiments of the present application will be described in detail in conjunction with the accompanying drawings. It should be noted that the embodiments and features of the embodiments in the present application may be arbitrarily combined with each other without conflict.

The processes shown in the flowcharts of the drawings may be performed in a computer system such as a group of computer-executable instructions. Also, while a logical order is shown in the flowcharts, in some cases, the processes shown or described may be performed in an order different than here.

Figure 1:
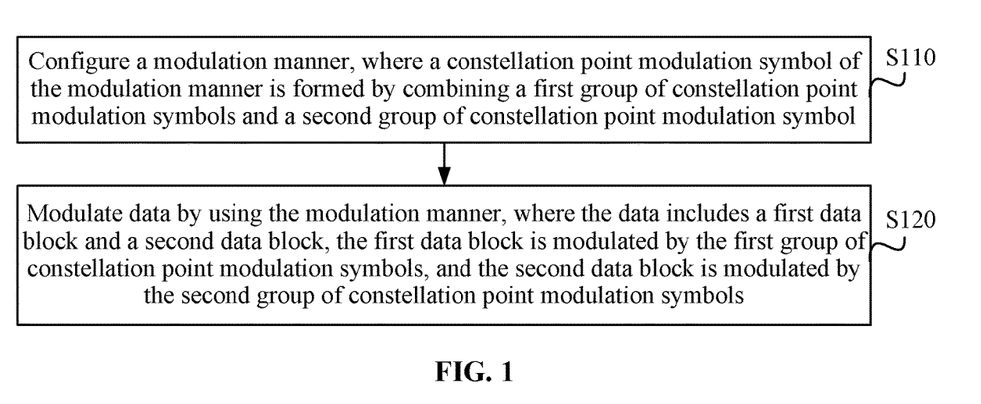
FIG. 1 is a flowchart of a data modulation method provided in an embodiment of the present application.

In an exemplary embodiment, FIG. 1 is a flowchart of a data modulation method provided in an embodiment of the present application, the method may be applicable in a case of a digital modulation, the method may be performed by a data modulation apparatus, the apparatus may be implemented by software and/or hardware, and may be integrated on a device, i.e., a terminal device, and the device may encompass any suitable type of user equipment and base station.

As shown in FIG. 1, the data modulation method provided in the present application includes following processes.

In S110, a modulation manner is configured, where a constellation point modulation symbol of the modulation manner is formed by combining a first group of constellation point modulation symbols and a second group of constellation point modulation symbols.

In the present application, the modulation manner is firstly configured when a data modulation is performed, and the constellation point modulation symbol of the modulation manner may be formed by combining the first group of constellation point modulation symbols and the second group of constellation point modulation symbols. The first group of constellation point modulation symbols and the second group of constellation point modulation symbols may have different characteristics. The first group of constellation point modulation symbols and the second group of constellation point modulation symbols may be used for modulating different data blocks, to reduce the impact of the phase noise on the demodulation performance of a certain data block. The first group of constellation points is used to modulate data of a user having a capability below a capability threshold or data of a user having a transmission condition below a transmission threshold.

The first group of constellation point modulation symbols includes, but is not limited to, a group of binary phase shift keying (BPSK) modulation symbols or a group of quadrature phase shift keying (QPSK) modulation symbols, where a phase difference between adjacent modulation symbols is $\pi/2$, The second group of constellation point modulation symbols may be BPSK modulation symbols or arbitrary modulation symbols.

In this process, a means of how to form the constellation point modulation symbol of the modulation manner by combining the first group of constellation point modulation symbols and the second group of constellation point modulation symbols is not defined, as long as it may be ensured that when data is modulated based on the constellation point modulation symbol of the modulation manner, the first group of constellation point modulation symbols and the second group of constellation point modulation symbols respectively modulate different data blocks to reduce the impact of the phase noise on the demodulation performance of a certain data block.

In this process, that the modulation manner is configured may include that: after a constellation point modulation symbol of this modulation manner is determined based on the constellation point modulation symbol of the modulation manner formed by combining the first group of constellation point modulation symbols and the second group of constellation point modulation symbols, the data may be modulated based on this constellation point modulation symbol.

In S120, data is modulated by using the modulation manner, where the data includes a first data block and a second data block, the first data block is modulated by the first group of constellation point modulation symbols, and the second data block is modulated by the second group of constellation point modulation symbols.

The first data block and the second data block may be divided based on the capability or the transmission condition of the user, for example, data of a single user having a capability below a capability threshold or data of a single user having a transmission condition below a transmission threshold is the first data block, and data of a single user having a capability above the capability threshold or a transmission condition above the transmission threshold is the second data block, and data of a single user having a capability equal to the capability threshold or a transmission condition equal to the transmission threshold may be either the first data block or the second data block. The first data block and the second data block may also be data of a same user.

In an embodiment, the first data block may be encoded control information, i.e., control information data. The control information data may be control information data of a single user or control information data of multiple users. The second data block may be traffic data of the user. The first group of constellation point modulation symbols may modulate the encoded control information, and the second group of constellation point modulation symbols may modulate the traffic data of the user.

After the modulation manner is configured, in this process, the data is modulated based on a configured modulation manner, where the first data block is modulated by the first group of constellation point modulation symbols, and the second data block is modulated by the second group of constellation point modulation symbols, whereby a hierarchical modulation is implemented to reduce the impact of the phase noise on the demodulation performance of the first data block.

In this process, the first data block being modulated by the first group of constellation point modulation symbols and the second data block being modulated by the second group of constellation point modulation symbols may be achieved based on a mapping manner. For example, bits corresponding to the data are mapped one-to-one with modulation manners so that bit information of the first data block is distinguished by different first group of constellation point modulation symbols, and bit information of the second data block is distinguished by different second group of constellation point modulation symbols.

The data may include data of a single user or may include data of at least one user. The content of the data is not limited and may be encoded control information or user data.

According to the data modulation method provided in the present application, firstly, the modulation manner is configured, where the constellation point modulation symbol of the modulation manner is formed by combining the first group of constellation point modulation symbols and the second group of constellation point modulation symbols; and then the data is modulated by using the modulation manner, where the data includes the first data block and the second data block, the first data block is modulated by the first group of constellation point modulation symbols, and the second data block is modulated by the second group of constellation point modulation symbols, whereby the phase noise is effectively suppressed by using this method during the data demodulation.

On the basis of the above-described embodiments, variant embodiments of the above-described embodiments have been proposed, and it should be noted herein that only differences from the above-described embodiments are described in the variant embodiments in order to simplify the description.

In an embodiment, that the constellation point modulation symbol of the modulation manner is formed by combining the first group of constellation point modulation symbols and the second group of constellation point modulation symbols includes: a phase of the second group of constellation point modulation symbols is adjusted based on a phase of the first group of constellation point modulation symbols; and the constellation point modulation symbol of the modulation manner is formed by combining the first group of constellation point modulation symbols and adjusted second group of constellation point modulation symbols.

When the constellation point modulation symbol of the modulation manner is determined, a phase of a second constellation point modulation symbol may firstly be adjusted based on a phase of the first group of constellation point modulation symbols, and then the constellation point modulation symbol of the modulation manner is formed by combining the first group of constellation point modulation symbols and the adjusted second constellation point modulation symbol. When the constellation point modulation symbol of the modulation manner is formed by combining, the constellation point modulation symbol may be formed by combination of a power normalization factor.

Firstly, the benefit of firstly adjusting the phase of the second constellation point modulation symbol is that a receiving terminal is less affected by the second constellation point modulation symbol when the first group of constellation point modulation symbols are demodulated, that is, the capability of the first data block to suppress the phase noise may be enhanced.

In an embodiment, the constellation point modulation symbol of the modulation manner is formed by combining following formulas:

$$S(n)=P(S1(k)+e^{j\theta(S1(k))}S2(m));$$

where $S(n)$ is a modulation symbol in a constellation point modulation symbol group $\{S(n)\}$ of the modulation manner, $S1(k)$ is a modulation symbol in the first group of constellation point modulation symbols $\{S1(k)\}$, and $\theta(S1(k))$ is a phase of $S1(k)$, $S2(m)$ is a modulation symbol in the second group of constellation point modulation symbols $\{S2(m)\}$; where $k=0, 1, \ldots, K-1$; $m=0, 1, \ldots, M-1$; $n=0, 1, \ldots, N-1$; N is an even integer greater than or equal to 4, $K<N$, $M<N$; and P is a constant. P is the power normalization factor.

In an embodiment, the first group of constellation point modulation symbols is a group of binary phase shift keying (BPSK) modulation symbols, and a phase difference between adjacent modulation symbols is $\pi/2$.

In an embodiment, that the first data block is modulated by the first group of constellation point modulation symbols includes that: the first group of constellation point modulation symbols is divided into two subgroups; and the first data block is modulated using the two subgroups alternately.

A number of groups being divided of the first group of constellation point modulation symbols may not be limited, for example being divided into at least two groups. For example, an odd-even grouping is performed on the first group of constellation point modulation symbols based on a number of bits, that is, the first group of constellation point modulation symbols are divided into odd-numbered bit groups and even-numbered bit groups. Then, the first data block is modulated based on each group of grouped constellation point modulation symbols to achieve a mapping modulation. For example, odd-numbered bits of the first data block are modulated by odd-numbered bit groups of modulation symbols of the first group of constellation point modulation symbols; and even-numbered bits are modulated by even-numbered bit groups of modulation symbols of the first group of constellation point modulation symbols.

In an embodiment, that the data is modulated by using the modulation manner includes that: the constellation point modulation symbol of the modulation manner is divided into two subgroups; and the data is modulated using the two subsets alternately.

The grouping manner and the corresponding modulation means of constellation point modulation symbols of the modulation manner may refer to the grouping manner and the corresponding modulation means of the first group of constellation point modulation symbols, which are not described herein again.

In an embodiment, a maximum modulus value of modulation symbols included in the second group of constellation point modulation symbols is less than one of following values: a maximum modulus value in the first group of constellation point modulation symbols; a minimum modulus value in the first group of constellation point modulation symbols; or half of a minimum modulus value in the first group of constellation point modulation symbols.

In this embodiment, a maximum modulus value in the second group of constellation point modulation symbols and the maximum modulus value in the first group of constellation point modulation symbols are limited, so that the peak average power ratio of the modulated data may be further reduced, and the influence of the phase noise on the first data block during demodulation is reduced.

In an embodiment, the data is mapped and modulated by using the constellation point modulation symbol of the modulation manner by taking per log 2N or per log 2(N/2) binary bit data sequences as a unit, and the binary bit data sequences are data sequences after being coded.

In this process, in order to achieve that the first data block is modulated by the first group of constellation point modulation symbols, the second block of data is modulated by the second constellation point modulation symbol, the data may be divided, and then the constellation point modulation symbol of the modulation manner is used for a mapping modulation, for example, bits in the data are mapped to the corresponding first group of constellation point modulation symbols and the second group of constellation point modulation symbols one by one for modulation.

When dividing the data, per $\log_2^{N}$ or per $\log_2^{(N/2)}$ binary bit data sequences may be used as a unit. A correspondence relationship in the mapping modulation may be determined based on a number of binary bit data sequences included in each unit, which is not limited herein. For example, 2 bits are used as a unit, a first bit data sequence corresponds to the first data block, and a second bit data sequence corresponds to the second data block, then the first bit data sequence may be modulated by using the first group of constellation point modulation symbols, and the second bit data sequence may be modulated by using the second constellation point modulation symbol to achieve the mapping modulation.

In an embodiment, bit data of the first data block is data of a single user having a capability below a capability threshold or data of a single user having a transmission condition below a transmission threshold.

The present application does not define specific values for the capacity threshold and the transmission threshold, which may be set by those skilled in the art according to actual conditions.

The data of the user having the capability below the capability threshold or the transmission condition below the transmission threshold may be modulated by the first group of constellation point modulation symbols, so that the data of the user may be better resistant to the influences of the phase noise upon being demodulated. The specific contents of the transmission condition are not intended to be limiting and may be determined based on actual conditions, for example, the transmission condition is based on any condition capable of determining the transmission performance. The determination of the capability is not limited, and those skilled in the art may set the capability according to the actual requirements, for example, the capability is determined based on a Category level.

In an embodiment, bit data of the first data block is encoded control information of a single user or encoded control information of multiple users.

The encoding manner is not limited here. The first data block may be encoded control information.

In an embodiment, the first data block and the second data block are data of a same user or data of different users.

In an embodiment, the method further includes that: the modulated data is transmitted on a physical resource.

After the data is modulated by using the constellation point modulation symbol of the modulation manner, the modulated data may be transmitted on a physical resource. The physical resource is not limited, as long as the receiving terminal may receive the modulated data.

In an embodiment, that the modulated data is transmitted on the physical resource includes that: the modulated data is transmitted in a time domain; or, the modulated data is transmitted on a radio frequency link after being processed, where a means of processing the modulated data includes a filtering and a digital-to-analog conversion, or a means of processing the modulated data includes a discrete Fourier transform (DFT), an inverse discrete Fourier transform (IDFT) and a digital-to-analog conversion.

In an embodiment, the method further includes that: transmitting identification information is transmitted, where the identification information indicates whether the data is modulated by using the constellation point modulation symbol of the modulation manner.

The identification information may be considered as information identifying the manner in which data is modulated. Based on this identification information, it may be determined whether the encoded data is modulated by using the constellation point modulation symbol of the modulation manner in the present application. The content of the identification information is not limited, as long as the receiving terminal may recognize the identification information.

The data modulation method provided in the present application is exemplarily described below, and the data modulation method provided in the present application may be considered as a low peak-to-average fractional layer modulation method that suppresses the phase noise.

Currently, a high frequency scene is one of the important scenes of the future beyond 5th generation (B5G) or 6th generation (6G).

The phase noise is relatively large in the high frequency scene, and even if the receiving terminal performs the phase compensation, much phase noise remains. Meanwhile, the Doppler shift in the high frequency scene is relatively large, and some phase deviation will remain in the data symbol even if the receiving terminal performs the frequency offset compensation. Especially for some low-level terminals, the phase noise will be larger due to low cost and poor performance of the device, and how to suppress the influence of the phase noise without affecting the spectral efficiency of the system needs to be considered, so that a new modulation scheme needs to be designed to solve the problem.

In the high frequency scene, the path loss and the shadow attenuation are large, and therefore the signal-to-noise ratio in some regions at the cell edge may be very low. Moreover, the efficiency of the power amplifier (PA) at high frequency is relatively low, and in order to improve the signal-to-noise ratio and also to save the power consumption of a battery of the user equipment (UE), it is necessary that the peak average power ratio (PAPR) of the signal transmitted by the UE is relatively low.

A massive machine type of communication (mMTC) scene is also one of the important scenes in the future B5G or 6G. In the mMTC scene, some terminal devices want to greatly save the power consumption of the battery, and therefore, in order to improve the PA efficiency of the terminal, it is necessary that the peak average power ratio of the signal transmitted by the UE is relatively low.

In the current new radio access technology (New Radio, NR) standard of fifth generation mobile communication (5G), although a phase tracking reference signal (PTRS) is designed, it is still difficult to satisfy the requirement of accurately estimating a large phase noise in the high frequency scene; although the peak average power ratio of a discrete Fourier transform-spread orthogonal frequency division multiplexing (DFT-s-OFDM) signal is low, the PAPR of the signal is still high for a modulation scheme having a modulation order greater than 1. It is therefore necessary to design higher order modulation techniques that further reduce the PAPR. That is, the phase noise of the high frequency scene is relatively high, and a well-designed modulation scheme is required to suppress the influence of the phase noise. Especially for some low-level terminals, it is necessary to solve how to suppress the influence of the phase noise without affecting the system efficiency. Moreover, the high frequency scene and the mMTC scene require a signal with a lower PAPR, so a modulation scheme with a low PAPR also needs to be designed.

The present application discloses a data modulation method, and the data modulation method includes described below.

One constellation point modulation symbol group $\{S(n)\}$, $n=0, 1 \ldots, N-1$, N is an even integer greater than or equal to 4, $S(n)$ satisfies $S(n)=P(S1(k)+e^{j\theta(S1(k))}S2(m))$, where $S1(k)$ is a modulation symbol among a group of constellation point modulation symbols $\{S1(k)\}$, and $\theta(S1(k))$ is a phase of $S1(k)$; $S2(m)$ is a modulation symbol among a group of constellation point modulation symbols $\{S2(m)\}$, $K=0, 1, \ldots K-1, m=0, 1, \ldots, M-1, K<N, M<N$, and P is a constant. Data is modulated by using the constellation point modulation symbol group $\{S(n)\}$, the data includes at least 2 encoded data blocks, i.e., an encoded data block 1 and an encoded data block 2, where bit data of the first data block is modulated using the $\{S1(k)\}$, and bit data of the second data block is modulated using the $\{S2(m)\}$. The modulated data symbol is transmitted on a physical resource.

The $\{S1(k)\}$ is a group of $\pi/2$ BPSK modulation symbols. That the data is modulated using the constellation point modulation symbol $\{S(n)\}$ includes: the $\{S(n)\}$ may be divided into two subgroups, where each subgroup includes N/2 constellation point modulation symbols; and the data is modulated using the two subgroups alternately. The $\{S1(k)\}$ may be divided into two subgroups, each subgroup includes K/2 constellation point modulation symbols, and the bit data of the encoded data block 1 is modulated using the two subgroups alternately. In M modulation symbols of the $\{S2(m)\}$, a maximum modulus value is less than a maximum modulus value in the $\{S1(k)\}$. In the M modulation symbols of the $\{S2(m)\}$, the maximum modulus value is less than the minimum modulus value in the $\{S1(k)\}$. In the M modulation symbols of the $\{S2(m)\}$, the maximum modulus value is less than half of the minimum modulus value in the {S1(k)}. That the data is modulated by using the constellation point modulation symbol group {S(n)} includes that: the data is mapped and modulated by using the constellation point modulation symbol group {S(n)} by taking per $\log_2^N$ or per $\log_2^{(N/2)}$ binary bit data sequences as a unit. The binary bit data sequences are data sequences after being coded. The encoded data sequences contain at least 2 encoded data blocks.

In an embodiment, the bit data of the coded data block 1 is control information data (data after the control information is coded, i.e. coded control information). The control information data is control information data of a single user; and the control information data is control information data of multiple users.

In an embodiment, the bit data of the encoded data block 1 is data of a single user (or, the bit data of the encoded data block 1 is sent to a single user). Further, the single user is a user with a lower capability, that is, a user with lower UE Category level; or the single user is a user with a poor transmission condition.

In an embodiment, the 2 encoded data blocks are data of a same user.

In an embodiment, the 2 encoded data blocks are data of different users.

In an embodiment, that the modulated data symbol, i.e., the modulated data, is transmitted on the physical resource includes: the data symbol is transmitted directly in a time domain, or, the data symbol is filtered, digital to analog converted, and the like, and then is transmitted over a radio frequency link.

In an embodiment, that the modulated data symbol is transmitted on the physical resource includes: the data symbol is subjected to discrete Fourier transform (DFT), inverse discrete Fourier transform (IDFT), digital-to-analog conversion, and the like, and then is transmitted over a radio frequency link.

In an embodiment, one bit of control information, i.e. identification information, indicates whether the modulated data symbol is hierarchically modulated, that is, the modulated data symbol is modulated by using the constellation point modulation symbol group {S(n)}.

In an embodiment, the identification information is sent in radio resource control (RRC) signaling or in a downlink control channel.

The data is modulated by using the constellation point modulation symbol group {S(n)}, the data includes at least 2 encoded data blocks, where bit data of the encoded data block 1 is modulated by using the {S1(k)}, and bit data of the encoded data block 2 is modulated by using the {S2(m)}. This has the benefit that a user with a lower UE Category level may use {S1(k)} for modulation, which may have better demodulation performance (may accommodate a lower signal-to-noise ratio and resist higher phase noise); or the control information may be modulated using { S1(k)}, which ensures lower bit error rate performance of the control information; and a user with better conditions may use {S2(m)} for modulation, which may improve the transmission efficiency of the system.

The {S1(k)} is a group of π/2 BPSK modulation symbols, which has the benefit that a user with a lower UE Category level may use {S1(k)} for modulation, which may have better demodulation performance (may accommodate a lower signal-to-noise ratio and resist higher phase noise). Moreover, a data signal modulated with {S(n)} may be made to have a low peak average power ratio (PAPR).

S(n) satisfies $S(n)=P(S1(k)+e^{j\theta(S1(k))}S2(m))$, this has the advantage that a data signal modulated with {S(n)} has a low PAPR, which makes data modulated with S1(k) be better resistant to higher phase noise.

In the M modulation symbols of {S2(m)}, a maximum modulus value is less than a maximum modulus value in {S1(k)}. This has the advantage that a data signal modulated with {S(n)} has a low PAPR, which makes data modulated with S1(k) be better resistant to higher phase noise.

Figure 1A:
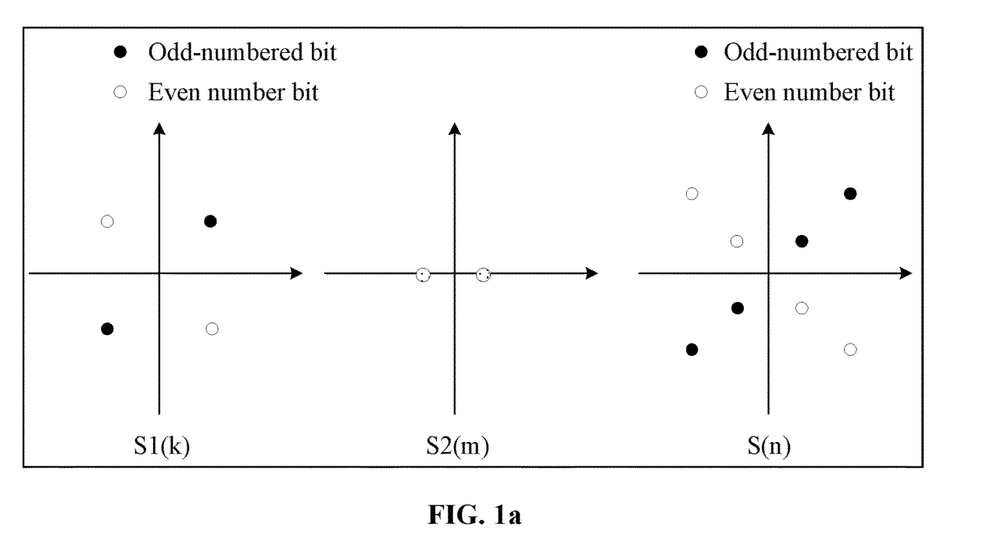
FIG. 1a is a schematic diagram of a constellation point modulation symbol of a combination modulation method provided in an embodiment of the present application.

In an embodiment, FIG. 1a is a schematic diagram of a constellation point modulation symbol of a combination modulation method provided in an embodiment of the present application, referring to FIG. 1a, where {S1(k)} is a group of π/2 BPSK modulation symbols, where an odd-numbered bits of modulation symbols are in a first quadrant and a third quadrant, the even-numbered bits of modulation symbols are in a second quadrant and a fourth quadrant, that is, {S1(k)} may be divided into two subgroups, each subgroup includes K/2 constellation point modulation symbols. {S2(m)} is a BPSK modulation symbol on a real axis, and the maximum modulus value in {S2(m)} is half of the maximum modulus value in {S1(k)}. A formula of $S(n)=P(S1(k)+e^{j\theta(S1(k))}S2(m))$ is generated according to the modulation symbol S(n), to obtain a constellation point expression of {S(n)}. Where N=8, K=4, M=2. Odd-numbered bits of modulation symbols in the constellation points of {S(n)} are in a first quadrant and a third quadrant, and even-numbered bits of modulation symbols are in a second quadrant and a fourth quadrant. That is, the {S(n)} may be divided into two subgroups, each subgroup contains N/2 constellation point modulation symbols, and the data is modulated by using these two subgroups alternately.

Figure 1B:
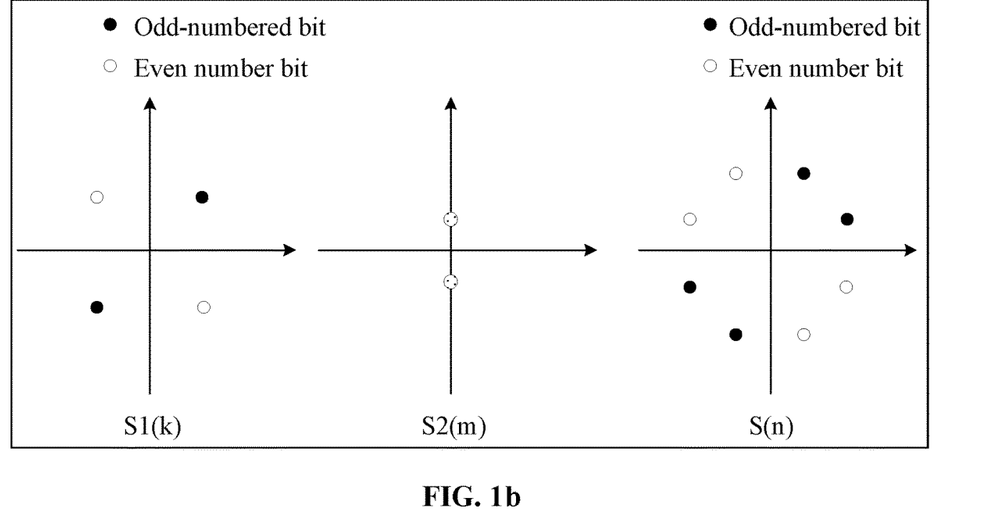
FIG. 1b is a schematic diagram of a constellation point modulation symbol of another combination modulation method provided in an embodiment of the present application.

In an embodiment, FIG. 1b is a schematic diagram of a constellation point modulation symbol of another combination modulation method provided in an embodiment of the present application, referring to FIG. 1b, where {S1(k)} is a group of π/2 BPSK modulation symbols, where an odd-numbered bits of modulation symbols are in a first quadrant and a third quadrant, the even-numbered bits of modulation symbols are in a second quadrant and a fourth quadrant, {S2(m)} is a BPSK modulation symbol on an imaginary axis, and the maximum modulus value in {S2(m)} is half of the maximum modulus value in {S1(k)}. A formula of $S(n)=P(S1(k)+e^{j\theta(S1(k))}S2(m))$ is generated according to the modulation symbol S(n), to obtain a constellation point expression of {S(n)}. Where N=8, K=4, M=2. Odd-numbered bits of modulation symbols in the constellation points of {S(n)} are in a first quadrant and a third quadrant, and even-numbered bits of modulation symbols are in a second quadrant and a fourth quadrant.

Figure 1C:
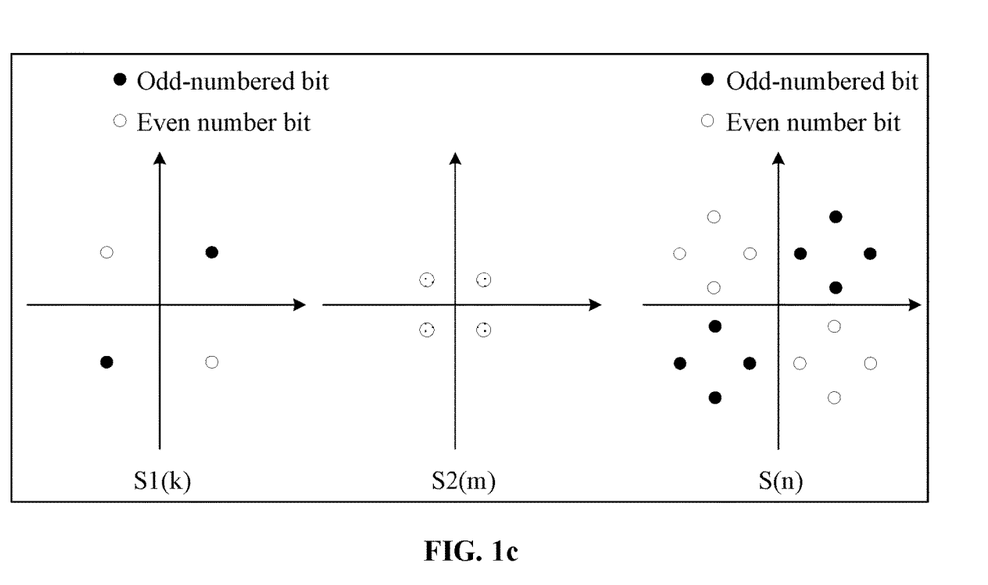
FIG. 1c is a schematic diagram of a constellation point modulation symbol of still another combination modulation method provided in an embodiment of the present application.

In an embodiment, FIG. 1c is a schematic diagram of a constellation point modulation symbol of still another combination modulation method provided in an embodiment of the present application, referring to FIG. 1c, where {S1(k)} is a group of π/2 BPSK modulation symbols, where an odd-numbered bits of modulation symbols are in a first quadrant and a third quadrant, the even-numbered bits of modulation symbols are in a second quadrant and a fourth quadrant, {S2(m)} is a QPSK modulation symbol, and the maximum modulus value in {S2(m)} is half of the maximum modulus value in {S1(k)}. A formula of $S(n)=P(S1(k)+e^{j\theta(S1(k))}S2(m))$ is generated according to the modulation symbol S(n), to obtain a constellation point expression of {S(n)}. Where N=16, K=4, M=4. Odd-numbered bits of modulation symbols in the constellation points of {S(n)} are in a first quadrant and a third quadrant, and even-numbered bits of modulation symbols are in a second quadrant and a fourth quadrant.

Figure 1D:
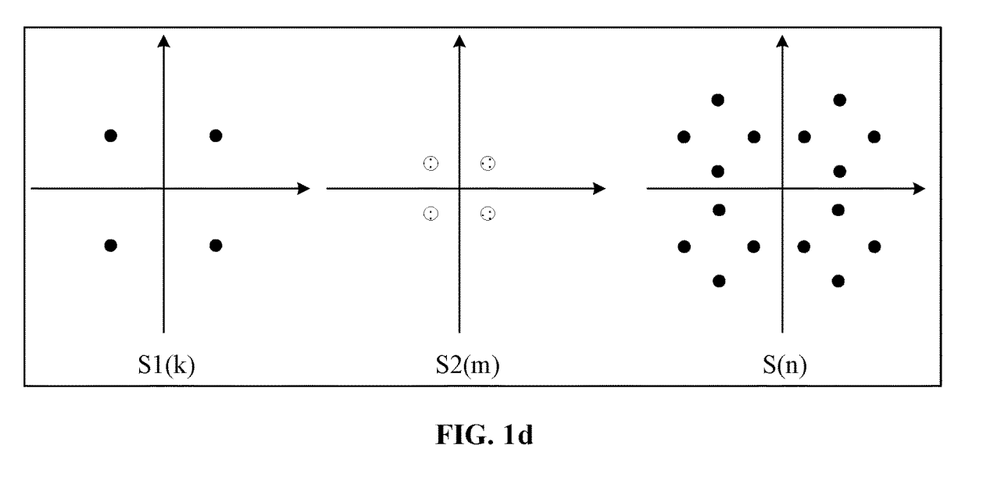
FIG. 1d is a schematic diagram of a constellation point modulation symbol of still another combination modulation method provided in an embodiment of the present application.

In an embodiment, FIG. 1d is a schematic diagram of a constellation point modulation symbol of still another combination modulation method provided in an embodiment of the present application, referring to FIG. 1d, where {S1(k)} is a group of QPSK modulation symbols, {S2(m)} is also a QPSK modulation symbol, and the maximum modulus value in {S2(m)} is half of the maximum modulus value in {S1(k)}. A formula of $S(n)=P(S1(k)+e^{j\theta(S1(k))}S2(m))$ is generated according to the modulation symbol S(n), to obtain a constellation point expression of {S(n)}. Where N=16, K=4, M=4.

Figure 1E:
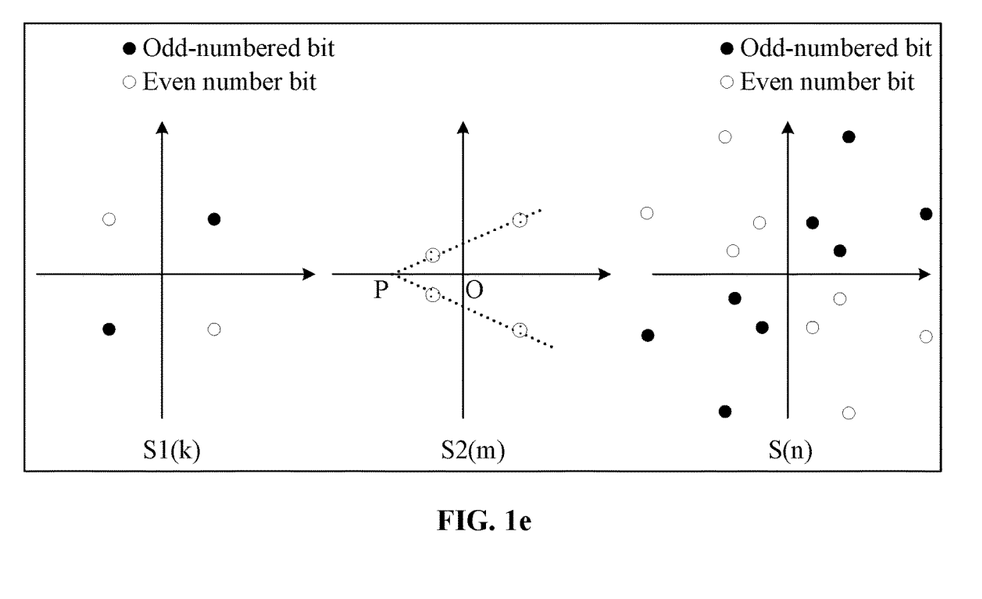
FIG. 1e is a schematic diagram of a constellation point modulation symbol of still another combination modulation method provided in an embodiment of the present application.

In an embodiment, FIG. 1e is a schematic diagram of a constellation point modulation symbol of still another combination modulation method provided in an embodiment of the present application, referring to FIG. 1e, where {S1(k)} is a group of π/2 BPSK modulation symbols, where an odd-numbered bits of modulation symbols are in a first quadrant and a third quadrant, the even-numbered bits of modulation symbols are in a second quadrant and a fourth quadrant, {S2(m)} is a specially modulated modulation symbol, and a distance of OP in the constellation diagram of {S2(m)} is the maximum modulus value in {S1(k)}. A formula of $S(n)=P(S1(k)+e^{j\theta(S1(k))}S2(m))$ is generated according to the modulation symbol S(n), to obtain a constellation point expression of {S(n)}. Where N=16, K=4, M=4. Odd-numbered bits of modulation symbols in the constellation points of {S(n)} are in a first quadrant and a third quadrant, and even-numbered bits of modulation symbols are in a second quadrant and a fourth quadrant. It can be seen that the constellation points of the modulation scheme may be composed of 2 circular rings, and each circular ring has 8 constellation points.

Figure 1F:
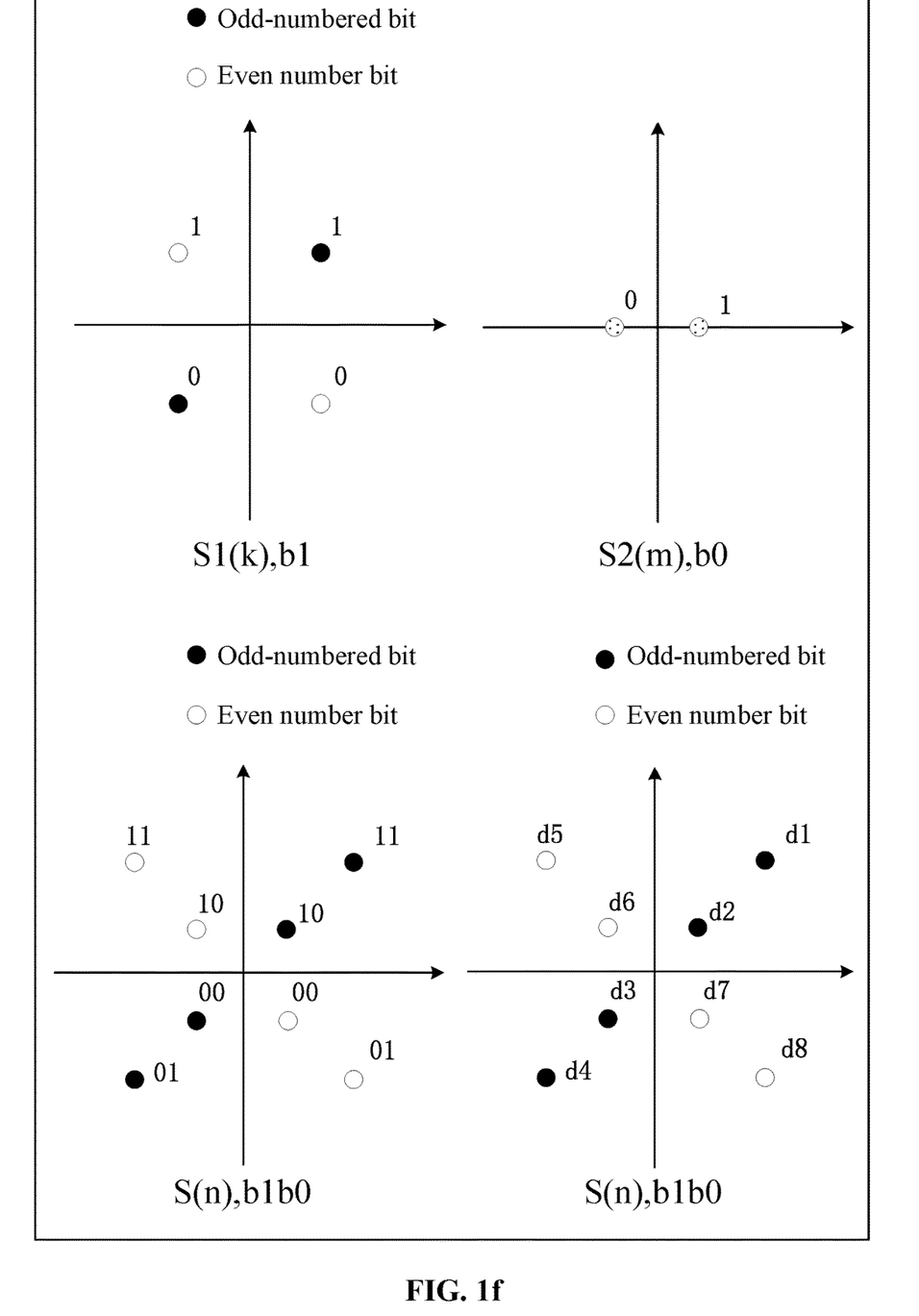
FIG. 1f is a schematic diagram of a constellation point modulation symbol and a bit map of a combination modulation method provided in an embodiment of the present application.

FIG. 1f is a schematic diagram of a constellation point modulation symbol and a bit map of a combination modulation method provided in an embodiment of the present application, referring to FIG. 1f, where {S1(k)} is a group of π/2 BPSK modulation symbols, where an odd-numbered bits of modulation symbols are in a first quadrant and a third quadrant, the even-numbered bits of modulation symbols are in a second quadrant and a fourth quadrant, {S2(m)} is a BPSK modulation symbol on a real axis, and the maximum modulus value in {S2(m)} is half of the maximum modulus value in {S1(k)}. A formula of $S(n)=P(S1(k)+e^{j\theta(S1(k))}S2(m))$ is generated according to the modulation symbol S(n), to obtain a constellation point expression of {S(n)}. Where N=8, K=4, M=2.

It is assumed that a group of binary bit data sequences consists of two encoded data blocks, which are the encoded data block data1 and the encoded data block data2, respectively. The data of the two data blocks are respectively:
  data1=01001110;
  data2=11000110;

The data sequence is modulated using {S(n)}, where a data bit of the encoded data block 1 is modulated with {S1(k)} and a data bit of the encoded data block 2 is modulated with {S2(m)}. In this embodiment, {S1(k)} and {S2(m)} are both BPSK-type modulations with a modulation orders of 1, and thus each modulation symbol S(n) may represent one bit of the encoded data block 1 and one bit of the encoded data block 2. Each bit in data1 and each bit in data2 may be sequentially composed of data3, data3=0111000010111100, every 2 bits in data3 are combined into a unit, and the data3 is modulated by using {S(n)}, so that each unit is modulated into a constellation point S(n).

In this embodiment, bit combinations of odd positions are modulated with (d1, d2, d3, d4) in the constellation point {S(n)}, and bit combinations of even positions are modulated with (d5, d6, d7, d8) in the constellation point {S(n)}. According to this modulation rule, it may be obtained that the modulation symbols of the data sequence data3 are modulated with {S(n)} are: [d4, d5, d3, d7, d2, d5, d1, d7].

The data modulation method provided in the present application may be performed by a device, such as a transmitting terminal. A group of binary bit data sequences are encoded, constellation modulated, that is, the data modulation method generates modulated data symbols that are subjected to DFT, resource mapping, IDFT, digital-to-analog conversion, etc., and then transmitted over the radio frequency link.

Figure 2:
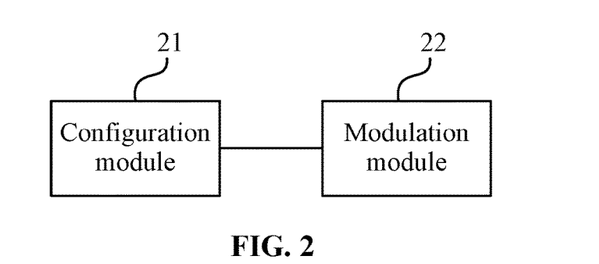
FIG. 2 is a schematic structural diagram of a data modulation apparatus provided in an embodiment of the present application.

The present application further provides a data modulation apparatus, FIG. 2 is a schematic structural diagram of a data modulation apparatus provided in an embodiment of the present application, the apparatus may be integrated on a device, referring to FIG. 2, the apparatus includes a configuration module 21 and a modulation module 22. The configuration module 21 is configured to configure a modulation manner, where a constellation point modulation symbol of the modulation manner is formed by combining a first group of constellation point modulation symbols and a second group of constellation point modulation symbols. The modulation module 22 is configured to modulate data by using the modulation manner, where the data includes a first data block and a second data block, the first data block is modulated by the first group of constellation point modulation symbols, and the second data block is modulated by the second group of constellation point modulation symbols.

The data modulation apparatus provided in this embodiment is configured to implement the data modulation method of the embodiments of the present application, and implementation principles and technical effects of the data modulation apparatus provided in this embodiment is similar to those of the data modulation method of the embodiments of the present application, which are not repeated here.

On the basis of the above-described embodiments, variant embodiments of the above-described embodiments have been proposed, and it should be noted herein that only differences from the above-described embodiments are described in the variant embodiments in order to simplify the description.

In an embodiment, the configuration module 21 is specifically configured to: adjust a phase of the second group of constellation point modulation symbols based on a phase of the first group of constellation point modulation symbols; and form the constellation point modulation symbol of the modulation manner based on a combination of the first group of constellation point modulation symbols and adjusted second group of constellation point modulation symbols.

In an embodiment, the constellation point modulation symbol of the modulation manner is formed by combining following formulas:

$$S(n)=P(S1(k)+e^{j\theta(S1(k))}S2(m));$$

where S(n) is a modulation symbol in a constellation point modulation symbol group {S(n)} of the modulation manner, S1(k) is a modulation symbol in the first group of constellation point modulation symbols {S1(k)}, and θ(S1(k)) is a phase of S1(k), S2(m) is a modulation symbol in the second group of constellation point modulation symbols {S2(m)}; where k=0, 1, . . . , K−1; m=0, 1, . . . , M−1; n=0, 1, . . . , N−1; N is an even integer greater than or equal to 4, K<N, M<N; and P is a constant.

In an embodiment, the first group of constellation point modulation symbols is a group of binary phase shift keying (BPSK) modulation symbols, and a phase difference between adjacent modulation symbols is π/2.

In an embodiment, the modulation module 22 is specifically configured to: divide the first group of constellation point modulation symbols into two subgroups; and modulate the first data block using the two subgroups alternately.

In an embodiment, the modulation module 22 is specifically configured to: divide the constellation point modulation symbol of the modulation manner into two subgroups; and modulate the data using the two subsets alternately.

In an embodiment, a maximum modulus value of modulation symbols included in the second group of constellation point modulation symbols is less than one of following values: a maximum modulus value in the first group of constellation point modulation symbols; a minimum modulus value in the first group of constellation point modulation symbols; or half of a minimum modulus value in the first group of constellation point modulation symbols.

In an embodiment, the data is mapped and modulated by using the constellation point modulation symbol of the modulation manner by taking per $\log_2^N$ or per $\log_2^{(N/2)}$ binary bit data sequences as a unit, and the binary bit data sequences are data sequences after being coded.

In an embodiment, bit data of the first data block is data of a single user having a capability below a capability threshold or data of a single user having a transmission condition below a transmission threshold.

In an embodiment, bit data of the first data block is encoded control information of a single user or encoded control information of multiple users.

In an embodiment, the first data block and the second data block are data of a same user or data of different users.

In an embodiment, the apparatus further includes a first transmission module. The first transmission module is configured to transmit the modulated data on a physical resource.

In an embodiment, the first transmission module is specifically configured to: transmit the modulated data in a time domain; or, transmit the modulated data on a radio frequency link after being processed, where a means of processing the modulated data includes a filtering and a digital-to-analog conversion, or a means of processing the modulated data includes a discrete Fourier transform (DFT), an inverse discrete Fourier transform (IDFT) and a digital-to-analog conversion.

In an embodiment, the apparatus further includes a second transmission module. The second transmission module is configured to transmit identification information, where the identification information indicates whether the data is modulated by using the constellation point modulation symbol of the modulation manner.

Figure 3:
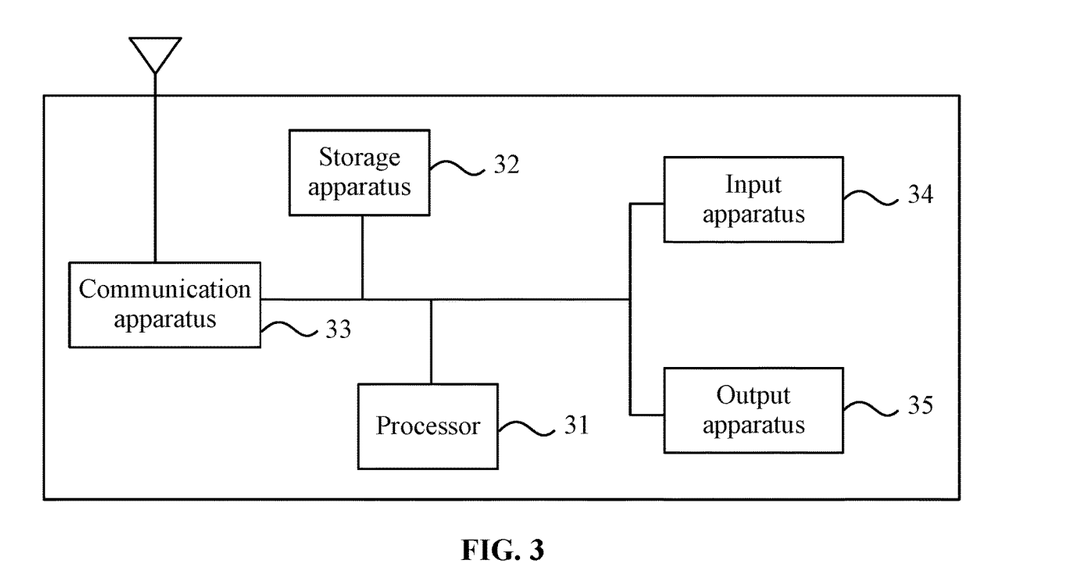
FIG. 3 is a schematic structural diagram of a device provided in an embodiment of the present application.

In an exemplary embodiment, an embodiment of the present application provides a device, FIG. 3 is a schematic structural diagram of a device provided in an embodiment of the present application. As shown in FIG. 3, the device provided in the present application includes one or more processors 31 and a storage apparatus 32; the processor 31 in the device may be one or more, one processor 31 is used as an example in FIG. 3; the storage apparatus 32 is configured to store one or more programs; and the one or more programs, when executed by the one or more processors 31, cause the one or more processors 31 to implement the method described in the embodiments of the present application.

The device further includes a communication apparatus 33, an input apparatus 34 and an output apparatus 35.

The processor 31, the storage apparatus 32, the communication apparatus 33, the input apparatus 34 and the output apparatus 35 in the device may be connected by a bus or in other manners, and they being connected by the bus is used as an example in FIG. 3.

The input apparatus 34 may be configured to receive input digital or character information and generate key signal inputs related to user settings and functional control of the device. The output apparatus 35 may include a display device such as a display screen.

The communication apparatus 33 may include a receiver and a transmitter. The communication apparatus 33 is configured to perform an information transceiving communication according to the control of the processor 31. Information includes, but is not limited to, modulated data.

As a computer-readable storage medium, the storage apparatus 32 may be configured to store software programs, computer-executable programs, and modules, such as program instructions/modules (such as, the configuration module 21 and the modulation module 22 in the data modulation apparatus) corresponding to the method described in the embodiments of the present application.

The storage apparatus 32 may include a storage program region and a storage data region, where the storage program region may store an operating system, an application program required for at least one function; the storage data region may store data created according to the use of the device, and the like. Moreover, the storage apparatus 32 may include a high-speed random access memory, and may further include a non-volatile memory, such as at least one magnetic disk storage device, a flash memory device, or other non-volatile solid state storage devices. In some examples, the storage apparatus 32 may further include a memory remotely disposed relative to the processor 31, these remote memory may be connected to the device via a network. Examples of such networks include, but are not limited to, an Internet, an intranet, a local area network, a mobile communication network, and combinations thereof

What is claimed is:

1. A data modulation method, comprising:
configuring a modulation manner, wherein a constellation point modulation symbol of the modulation manner is formed by combining a first group of constellation point modulation symbols and a second group of constellation point modulation symbols; and
modulating data by using the modulation manner, wherein the data comprises a first data block and a second data block, the first data block is modulated by the first group of constellation point modulation symbols, and the second data block is modulated by the second group of constellation point modulation symbols.

2. The method of claim 1, wherein that the constellation point modulation symbol of the modulation manner is formed by combining the first group of constellation point modulation symbols and the second group of constellation point modulation symbols comprises:
adjusting a phase of the second group of constellation point modulation symbols based on a phase of the first group of constellation point modulation symbols; and
forming, based on a combination of the first group of constellation point modulation symbols and adjusted second group of constellation point modulation symbols, the constellation point modulation symbol of the modulation manner.

3. The method of claim 2, wherein the constellation point modulation symbol of the modulation manner is formed by combining following formulas:

$$S(n)=P(S1(k)+e^{j\theta(S1(k))}S2(m));$$

wherein S(n) is a modulation symbol in a constellation point modulation symbol group {S(n)} of the modulation manner, S1(k) is a modulation symbol in the first group of constellation point modulation symbols {S1(k)}, and θ(S1(k)) is a phase of S1(k), S2(m) is a modulation symbol in the second group of constellation point modulation symbols {S2(m)}; wherein k=0, 1, ..., K−1; m=0, 1, ..., M−1; n=0, 1, ..., N−1; N is an even integer greater than or equal to 4, K<N, M<N; and P is a constant.

4. The method of claim 1, wherein the first group of constellation point modulation symbols is a group of binary phase shift keying (BPSK) modulation symbols, and a phase difference between adjacent modulation symbols is π/2.

5. The method of claim 1, wherein that the first data block is modulated by the first group of constellation point modulation symbols comprises:
dividing the first group of constellation point modulation symbols into two subgroups; and
modulating the first data block using the two subgroups alternately.

6. The method of claim 1, wherein modulating the data by using the modulation manner comprises:
dividing the constellation point modulation symbol of the modulation manner into two subgroups; and
modulating the data using the two subsets alternately.

7. The method of claim 1, wherein a maximum modulus value of modulation symbols comprised in the second group of constellation point modulation symbols is less than one of following values: a maximum modulus value in the first group of constellation point modulation symbols; a minimum modulus value in the first group of constellation point modulation symbols; or half of a minimum modulus value in the first group of constellation point modulation symbols.

8. The method of claim 1, wherein the data is mapped and modulated by using the constellation point modulation symbol of the modulation manner by taking per $\log_2^N$ or per $\log_2^{(N/2)}$ binary bit data sequences as a unit, and the binary bit data sequences are data sequences after being coded.

9. The method of claim 1, wherein bit data of the first data block is data of a single user having a capability below a capability threshold or data of a single user having a transmission condition below a transmission threshold.

10. The method of claim 1, wherein bit data of the first data block is encoded control information of a single user or encoded control information of a plurality of users.

11. The method of claim 1, wherein the first data block and the second data block are data of a same user or data of different users.

12. The method of claim 1, further comprising:
transmitting the modulated data on a physical resource.

13. The method of claim 12, wherein transmitting the modulated data on the physical resource comprises:
transmitting the modulated data in a time domain; or, transmitting the modulated data on a radio frequency link after being processed, wherein a means of processing the modulated data comprises a filtering and a digital-to-analog conversion, or a means of processing the modulated data comprises a discrete Fourier transform (DFT), an inverse discrete Fourier transform (IDFT) and a digital-to-analog conversion.

14. The method of claim 1, further comprising:
transmitting identification information, wherein the identification information indicates whether the data is modulated by using the constellation point modulation symbol of the modulation manner.

15. A device, comprising:
one or more processors;
a storage apparatus, which is configured to store one or more programs;
wherein the one or more programs, when executed by the one or more processors, cause the one or more processors to execute operations, the operations comprises:
configuring a modulation manner, wherein a constellation point modulation symbol of the modulation manner is formed by combining a first group of constellation point modulation symbols and a second group of constellation point modulation symbols; and
modulating data by using the modulation manner, wherein the data comprises a first data block and a second data block, the first data block is modulated by the first group of constellation point modulation symbols, and the second data block is modulated by the second group of constellation point modulation symbols.

16. A non-transitory storage medium, storing a computer program, wherein the computer program, when executed by a processor, executes operations, the operations comprises:
configuring a modulation manner, wherein a constellation point modulation symbol of the modulation manner is formed by combining a first group of constellation point modulation symbols and a second group of constellation point modulation symbols; and
modulating data by using the modulation manner, wherein the data comprises a first data block and a second data block, the first data block is modulated by the first group of constellation point modulation symbols, and the second data block is modulated by the second group of constellation point modulation symbols.

17. The device of claim 15, wherein that the constellation point modulation symbol of the modulation manner is formed by combining the first group of constellation point modulation symbols and the second group of constellation point modulation symbols comprises:
adjusting a phase of the second group of constellation point modulation symbols based on a phase of the first group of constellation point modulation symbols; and
forming, based on a combination of the first group of constellation point modulation symbols and adjusted second group of constellation point modulation symbols, the constellation point modulation symbol of the modulation manner.

18. The device of claim 17, wherein the constellation point modulation symbol of the modulation manner is formed by combining following formulas:

$$S(n)=P(S1(k)+e^{j\theta(S1(k))}S2(m));$$

wherein S(n) is a modulation symbol in a constellation point modulation symbol group {S(n)} of the modulation manner, S1(k) is a modulation symbol in the first group of constellation point modulation symbols {S1(k)}, and θ(S1(k)) is a phase of S1(k), S2(m) is a modulation symbol in the second group of constellation point modulation symbols {S2(m)}; wherein k=0, 1, ..., K−1; m=0, 1, ..., M−1; n=0, 1, ..., N−1; N is an even integer greater than or equal to 4, K<N, M<N; and P is a constant.

19. The device of claim 15, wherein the first group of constellation point modulation symbols is a group of binary phase shift keying (BPSK) modulation symbols, and a phase difference between adjacent modulation symbols is $\pi/2$.

20. The device of claim 15, wherein that the first data block is modulated by the first group of constellation point modulation symbols comprises:
   dividing the first group of constellation point modulation symbols into two subgroups; and
   modulating the first data block using the two subgroups alternately.

* * * * *